(12) United States Patent
Firu et al.

(10) Patent No.: US 10,338,558 B2
(45) Date of Patent: Jul. 2, 2019

(54) SEQUENTIAL LOGIC CIRCUITRY WITH REDUCED DYNAMIC POWER CONSUMPTION

(71) Applicant: 21, Inc., San Francisco, CA (US)

(72) Inventors: Daniel Firu, San Jose, CA (US); Veerbhan Kheterpal, San Carlos, CA (US); Nigel Drego, San Francisco, CA (US)

(73) Assignee: 21, Inc., San Francisco, CA (US)

(*) Notice: Subject to any disclaimer, the term of this patent is extended or adjusted under 35 U.S.C. 154(b) by 487 days.

(21) Appl. No.: 14/839,645

(22) Filed: Aug. 28, 2015

(65) Prior Publication Data

US 2016/0109870 A1    Apr. 21, 2016

Related U.S. Application Data

(60) Provisional application No. 62/065,547, filed on Oct. 17, 2014.

(51) Int. Cl.
*G05B 19/045* (2006.01)
*H03K 3/356* (2006.01)
(Continued)

(52) U.S. Cl.
CPC .......... *G05B 19/045* (2013.01); *H03K 3/356* (2013.01); *H03K 19/0016* (2013.01); *H04L 9/0643* (2013.01); *H04L 2209/12* (2013.01)

(58) Field of Classification Search
CPC .......... G06F 7/57; G06F 7/584; H03K 3/356; H03K 3/03; H04L 9/0643; G06Q 20/06; G05B 19/045

(Continued)

(56) References Cited

U.S. PATENT DOCUMENTS 4,786,829 A * 11/1988 Letcher ............ H03K 19/17716
                                                    326/46
5,097,151 A *  3/1992 Eerenstein .......... G05B 19/045
                                                    326/46
(Continued)

FOREIGN PATENT DOCUMENTS

TW    201033834 A    9/2010
TW      I425228 B    2/2014

OTHER PUBLICATIONS

J. Barkatullah et al, "Goldsttrike 1: Cointerra's first generation crypto-currency processor for bitcoin mining machines", IEEE, 2014.*

(Continued)

*Primary Examiner* — Shanto Abedin
(74) *Attorney, Agent, or Firm* — Jeffrey Schox; Diana Lin

(57) ABSTRACT

Digital systems formed on integrated circuits may include sequential logic circuitry. The sequential logic circuitry may form at least part of a finite state machine that records different logical states. The sequential logic circuitry may include a first latching circuit and a second latching circuit that each latch bits onto their respective outputs when clocked at different levels. The first latching circuit may output a first bit. Combinational logic circuitry may be distributed on both sides of the first latching circuit such that a combinational logic circuit interposed between the first and second latching circuits generates a second bit based on at least the first bit. The first and second bits may record one of two possible finite logical states of the sequential logic circuitry. By distributing combinational logic circuitry on two sides of a given latching circuit, dynamic power consumption by the sequential logic circuitry may be optimized.

13 Claims, 8 Drawing Sheets

(51) Int. Cl.
*H04L 9/06* (2006.01)
*H03K 19/00* (2006.01)

(58) Field of Classification Search
USPC .............................................. 380/28; 326/93
See application file for complete search history.

(56) References Cited

U.S. PATENT DOCUMENTS

| | | | |
|---|---|---|---|
| 5,221,866 A | 6/1993 | Takatsu | |
| 5,859,995 A | 1/1999 | Hewitt | |
| 6,041,371 A * | 3/2000 | Provence | G06F 7/00 |
| | | | 326/46 |
| 6,446,216 B1 * | 9/2002 | Shelley | G06F 7/00 |
| | | | 713/324 |
| 6,501,816 B1 | 12/2002 | Kouznetsov et al. | |
| 6,711,724 B2 | 3/2004 | Yoshikawa | |
| 6,937,688 B2 | 8/2005 | Chen et al. | |
| 7,643,591 B2 | 1/2010 | Arsovski et al. | |
| 7,849,349 B2 * | 12/2010 | Tamlyn | H03K 3/03 |
| | | | 326/93 |
| 8,832,511 B2 | 9/2014 | Chen et al. | |
| 2004/0148553 A1 * | 7/2004 | Nalbantis | G01R 31/318555 |
| | | | 714/726 |
| 2008/0043890 A1 | 2/2008 | Arsovski et al. | |
| 2008/0238483 A1 * | 10/2008 | Tamlyn | H03K 3/03 |
| | | | 326/93 |
| 2009/0198970 A1 | 8/2009 | Emma et al. | |
| 2013/0047049 A1 * | 2/2013 | Chen | G01R 31/318536 |
| | | | 714/733 |
| 2015/0379416 A1 * | 12/2015 | Holtzman | G06Q 30/0201 |
| | | | 706/11 |

OTHER PUBLICATIONS

Milly Bitcoin, "What problem is solved by bitcoin miners?", cointext.com, 2013.*

* cited by examiner

| $S_1'$ | $S_1''$ | Action |
|---|---|---|
| 0 | 0 | A |
| 0 | 1 | A |
| 1 | 0 | B |
| 1 | 1 | B |

FIG. 3

| $P_i$ | $F_1$ | $F_2$ | $F_1'$ | $F_2'$ | |
|---|---|---|---|---|---|
| 0 | 0 | 0 | 1 | 0 | } State A |
| 0 | 0 | 1 | 1 | 0 | |
| 0 | 1 | 0 | 1 | 1 | } State D |
| 0 | 1 | 1 | 0 | 0 | } State C |
| 1 | 0 | 0 | 0 | 1 | } State B |
| 1 | 0 | 1 | 0 | 1 | |
| 1 | 1 | 0 | 1 | 0 | } State A |
| 1 | 1 | 1 | 1 | 1 | } State D |

$$F_1' = \overline{P_i} F_1 F_2 + P_i \overline{F_1}$$

$$F_2' = P_i \overline{F_1} + F_1 (\overline{P_i \oplus F_2})$$

SEQUENTIAL LOGIC CIRCUITRY WITH REDUCED DYNAMIC POWER CONSUMPTION

This application claims the benefit of and claims priority to provisional patent application No. 62/065,547, filed Oct. 17, 2014, which is hereby incorporated by reference herein in its entirety.

BACKGROUND

This relates to digital logic circuitry, and more particularly, to sequential logic circuitry.

A sequential logic circuit receives an input signal, records states of a corresponding system based on the input signal (i.e., in memory), and produces an output signal dependent upon the recorded states of the input signal. The sequential logic circuit typically includes combinational logic and memory circuitry coupled to the combinational logic that records the input signal after the input signal has been acted upon by the combinational logic.

Sequential logic circuits are often used to form digital state machines such as so-called finite state machines that record particular finite states based on the input signal received by the sequential logic circuitry and the combinational logic in the sequential logic circuitry. Finite state machines are typically used as digital logic components in a wide range of digital circuit devices such as memory devices or any other digital devices that rely on the recordation of one or more logical states.

FIG. 1 is a diagram of conventional sequential logic circuitry. As shown in FIG. 1, sequential logic circuitry 10 includes flip flop circuits 12 (i.e., a first flip flop 12-1, a second flip flop 12-2, and third flip flop 12-3). Combinational logic 18 is formed between each pair of flip flops 12 (i.e., first combinational logic 18-1 is formed between flip flops 12-1 and 12-2, whereas second combinational logic 18-2 is formed between flip flops 12-2 and 12-3). Flip flop circuits 12 are clocked using clock signal CLK0 received over clock line 14. Sequential logic circuit 10 receives a data input over line 16. Flip flops 12 in the arrangement of FIG. 1 are rising edge triggered flip flops, such that data bits at an input of a given flip flop are only latched onto the output of that flip flop when a rising edge of clock signal CLK0 is received.

In the arrangement shown in FIG. 1, when clock signal CLK0 is pulsed high, a data bit $S_0$ on input line 16 is latched at the output of flip flop 12-1. Data bit $S_0$ is fed to combinational logic 18-1 which performs combinational logic operations on the bit to generate bit $S_1$ that is provided to an input of flip flop 12-2. When clock signal CLK0 is pulsed high, data bit $S_1$ (i.e., corresponding to bit $S_0$ after being operated on by logic 18-1) is latched onto the output of flip flop 12-2. Data bit $S_1$ is fed to combinational logic 18-2 which performs combinational logic operations on the bit to generate bit $S_2$ that is provided to an input of flip flop 12-3. When clock signal clk0 is pulsed high, data bit $S_2$ is latched to the output of flip flop 12-3. Data bits $S_0$, $S_1$, and $S_2$ are output over lines 20 and collectively define the state of sequential logic circuitry 10 (i.e., a first state of circuitry 10 is defined when $S_0=0$, $S_1=0$, and $S_2=0$, whereas a second state of circuitry 10 is defined when $S_0=0$, $S_1=0$, and $S_2=1$, etc.).

Combinational logic circuits 18-1 and 18-2 each have a given logic depth N (corresponding to the number of logical elements in each logic circuit). Dynamic power used by combinational logic circuits 18 is proportional to the number of logic elements in the circuit (i.e., proportional to the logic depth of the circuit). If care is not taken, combinational logic circuits 18 in circuitry 10 can consume excessive dynamic power for recording a given state. It may therefore be desirable to be able to provide sequential logic circuitry with improved dynamic power consumption.

SUMMARY OF THE INVENTION

Digital computing systems may include digital logic circuitry such as sequential logic circuitry that is formed on one or more integrated circuits. The sequential logic circuitry may form at least a portion of one or more finite state machines that record (identify) finite logical states for the digital computing system implemented on the integrated circuit. The sequential logic circuitry may output a set of bits that represent the logical state of the finite state machine (e.g., bits that, when combined, record one or more different possible logical states for the digital system).

In accordance with an embodiment, the sequential logic circuitry may include a first latching circuit that is configured to output a first bit and a second latching circuit that is configured to output a second bit. Combinational logic circuitry (e.g., combinatorial logic circuitry or other logic circuitry that performs desired Boolean logical operations on a set of inputs to generate a logical output) may be interposed between the first and second latching circuits and may generate the second bit based on at least the first bit and optional control bits received from external control circuitry on the integrated circuit. The first and second bits output by the first and second latching circuits may record a given one of only two possible finite logical states for the digital computing system (e.g., such that the bit depth and dynamic power consumption of the combinational logic circuitry may be reduced relative to conventional logic circuitry having two flip-flops for recording one of four possible finite logical states).

The first and second latching circuits may receive a clock signal from clocking circuitry on the integrated circuit. The first and second latching circuits may each latch bits onto their outputs when the clock signal is at a different logical level (e.g., the first latching circuit may be a positive level sensitive latching circuit that passes bits to its output when clocked high whereas the second latching circuit is a negative level sensitive latching circuit that passes bits to its output when clocked low, or the first latching circuit may be a negative level sensitive latching circuit whereas the second latching circuit is a positive level sensitive latching circuit).

In accordance with any of the above embodiments, the sequential logic circuitry may include a third latching circuit and second combinational logic circuitry interposed between the second latching circuit and the third latching circuit. If desired, the sequential logic circuitry may include a fourth latching circuit, third combinational logic circuitry interposed between the fourth latching circuit and the third latching circuit. The third combinational logic circuitry may receive a third bit and may generate a fourth bit based on at least the third bit. The fourth latching circuit may be configured to output the fourth bit. If desired, the first, second, third, and fourth bits may record a given one of only four possible finite logical states for the digital computing system.

In accordance with any of the above embodiments, the integrated circuit may include processing circuitry. The sequential logic circuitry may include a first output path coupled to an output of the first latching circuit and configured to convey the first bit to the processing circuitry and a second output path coupled to an output of the second latching circuit and configured to convey the second bit to the processing circuitry. The processing circuitry may be configured to combine the first and second bits to identify the given one of the two possible finite logical states that is recorded by the sequential logic circuitry.

In accordance with any of the above embodiments, the second latching circuit (e.g., a latch in the second latching circuit) may be configured to block the second bit from passing to its output when the clock signal is received at a first logic level, whereas the first latching circuit may be configured to block the first bit from passing its output when the clock signal is received at a second logic level that is different from the first logic level (e.g., the latching circuits may serve as flood gates for the sequential logic circuitry).

In accordance with any of the above embodiments, the integrated circuit may include one or more processing cores and control circuitry that controls the processing cores to solve a cryptographic puzzle by assigning a different search space to each of the processing cores. The sequential logic circuitry may be formed on one or more of the processing cores and may be used for performing desired logical operations associated with solving the cryptographic puzzle (e.g., the two logical states of the finite state machine may be used in solving the cryptographic puzzle). The control circuitry may control the processing cores to generate a crypto-currency by solving the cryptographic puzzle by performing Simple Hash Algorithm 265 (SHA-256) hashing operations (e.g., to generate a Bitcoin crypto-currency).

In accordance with another embodiment, the finite state machine circuitry may include a first round of latching circuits having first latch inputs and first latch outputs, a second round of latching circuits having second latch inputs and second latch outputs, and combinational logic circuitry that receives a first set of bits from the first latch outputs and that generates a second set of bits based on the first set of bits and that provides the second set of bits to the second latch inputs. The second set of bits may be used by the finite state machine to record one of two possible finite logical states.

If desired, additional combinational logic circuitry that receives the second set of bits from the second latch outputs may have outputs coupled to the first latch inputs. The first and second rounds of latching circuitry may be clocked using a clock signal received from the clocking circuitry. The first round of latching circuitry may be configured to pass the first set of bits from the first latch inputs to the first latch outputs when the clock signal is received at a first logic level (e.g., logic high) whereas the second round of latching circuitry may be configured to pass the second set of bits from the second latch inputs to the second latch outputs when the clock signal is received at a second logic level that is different from the first logic level (e.g., logic low).

In accordance with any of the above embodiments, the second round of latching circuitry may include a first latch that receives a first bit of the second set of bits and a second latch that receives a second bit of the second set of bits. The second round of latching circuitry may be configured to block the first and second bits from passing from the second set of latch inputs to the second set of latch outputs when the clock signal is received at the first logic level.

Further features of the invention, its nature and various advantages will be more apparent from the accompanying drawings and the following detailed description of the preferred embodiments.

BRIEF DESCRIPTION OF THE DRAWINGS

FIG. 3 is an illustrative diagram showing how data bits latched by two sequential latch circuits in sequential logic circuitry of the type shown in FIG. 2 may be combined to represent two different actions (e.g., states), thereby allowing combinational logic that outputs two different states to be distributed on two sides of a given latch circuit for reducing dynamic power consumption in accordance with an embodiment of the present invention.

DETAILED DESCRIPTION

Figure 1:
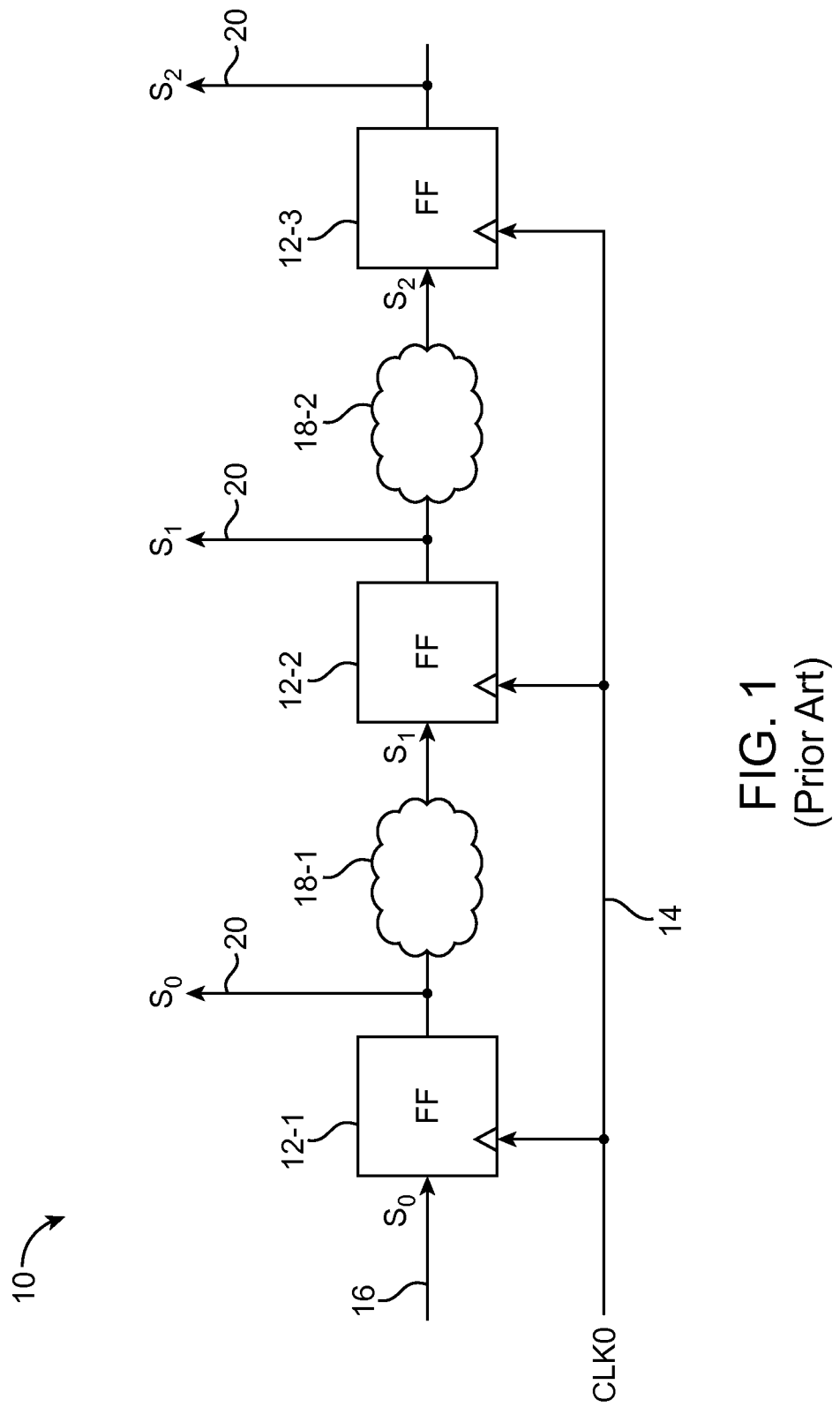
FIG. 1 is a diagram of conventional sequential logic circuitry having combinational logic circuits, each with a given logic depth, that store data bits to record multiple logical states.

The present invention relates to digital logic circuitry, and more particularly, to sequential logic circuitry.

Sequential logic circuitry may be used to form a finite state machine that records finite logical states of a digital system. Such finite state machines may serve as fundamental building blocks of digital logic devices or any other digital logic circuitry that requires recordation of one or more logical states.

Sequential logic circuitry may receive input signals (e.g., input data), record states of the corresponding system based on the input signals in storage circuitry (e.g., as an ordered set of binary bits "1" and "0"), and produce an output signal that is at least partially dependent upon the input signal. The output signal may represent a corresponding state of the sequential logic circuitry sometimes referred to as a system state (e.g., a state of a corresponding digital system or finite state machine). As an example, a given sequential logic circuit may store two different binary bits that collectively represent four different system states (e.g., a first state "00," a second state "01," a third state "10," and a fourth state "11"). In general, a given sequential logic circuit may store any desired number N of different binary bits representing $2^N$ different system states (e.g., three bits representing eight system states, four bits representing sixteen system states, five bits representing thirty-two system states, etc.). Each bit used to represent the system state may be generated and stored in the sequential logic circuitry based on the input signals and combinational logic (sometimes referred to as combinatorial logic) in the sequential logic circuitry.

In order to store the binary bits that define the system states, the sequential logic circuit may include one or more rounds of combinational logic circuitry each interposed between corresponding storage circuits (e.g., memory circuits). The storage circuitry may record the input signals after the input signals have been acted upon by corresponding combinational logic. The combinational logic may include any desired logical gates connected in any desired manner to perform any desired logical operations (computations) on the input signals.

The combinational logic may have a corresponding logic depth. In general, the logic depth is proportional to the number of logic elements/computations performed by the combinational logic, and dynamic power consumption and undesirable dynamic power glitching in the sequential logic circuitry is proportional to the logic depth of the combinational logic in the sequential logic circuitry (e.g., combinational logic having a greater logic depth requires more dynamic power and involves more dynamic power glitching than combinational logic having a reduced logic depth). It may therefore be desirable to reduce the logic depth of the combinational logic within sequential logic circuitry without sacrificing the ability to record and output a desired number of finite states.

Figure 2:
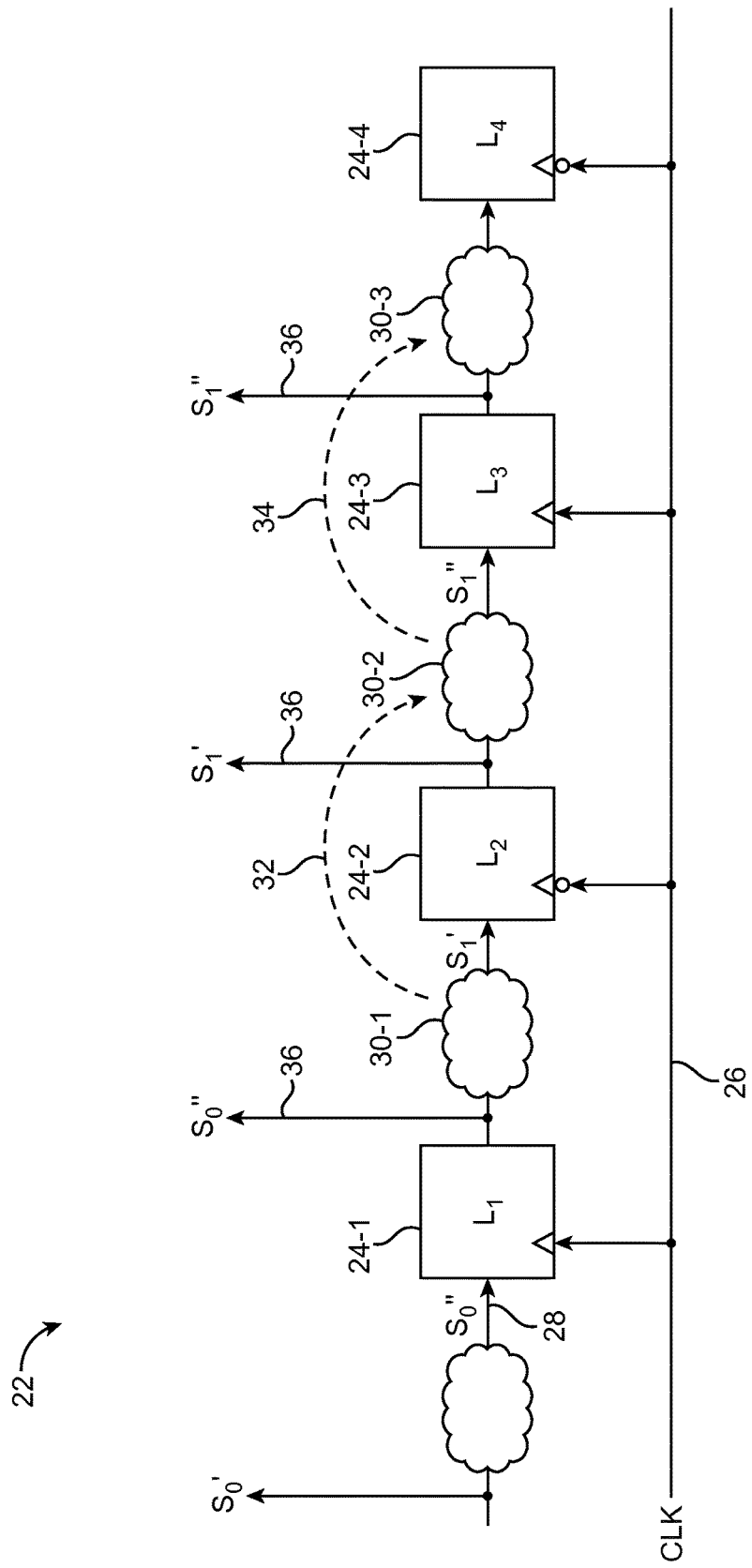
FIG. 2 is an illustrative diagram of sequential logic circuitry that stores data bits to record multiple logical states and that has combinational logic with reduced logic depth relative to conventional sequential logic circuitry of the type shown in FIG. 1 for optimizing dynamic power consumption in accordance with an embodiment of the present invention.

FIG. 2 is an illustrative diagram of sequential logic circuitry having distributed combinational logic for optimizing dynamic power consumption without sacrificing the ability to record a desired number of finite system states. As shown in FIG. 2, sequential logic circuitry 22 includes multiple latching circuits 24 (e.g., a first latch circuit 24-1, a second latch circuit 24-2, a third latch circuit 24-3, and a fourth latch circuit 24-4). Latch circuits 24 may be clocked using a clock signal CLK received over clock line 26. Clock signal CLK may be generated by any desired clocking circuitry (e.g., a phase-locked loop (PLL) circuit, a voltage controlled oscillator (VCO) circuit, an off-chip crystal oscillator, etc.). The components of sequential logic circuitry 22 may be each be formed on a common integrated circuit or may be formed on two or more separate integrated circuits.

Sequential logic circuitry 22 may include positive level sensitive latch circuits and negative level sensitive latch circuits. If desired, latching circuits 24 may include positive level sensitive latch circuits interposed with negative level sensitive latch circuits. As shown in FIG. 2, negative level sensitive latch circuit 24-2 is interposed between positive level sensitive latch circuits 24-1 and 24-3, and positive level sensitive latch circuit 24-3 is interposed between negative level sensitive latch circuits 24-2 and 24-4. Positive level sensitive latch circuits in circuitry 22 such as latch circuits 24-1 and 24-3 may latch data at their outputs (e.g., may allow data to pass from their input to their output) whenever clock signal CLK is high (e.g., at logic level "1"), whereas negative level sensitive latch circuits such as latch circuits 24-2 and 24-4 latch data at their outputs whenever clock signal CLK is low (e.g., at logic level "0"). Similarly, positive level sensitive latch circuits 24-1 and 24-3 do not latch data at their outputs (e.g., effectively blocking data at the input of the latch circuit from being passed to the output of that latch circuit) whenever clock signal CLK is low, whereas negative level sensitive latch circuits 24-2 and 24-4 do not latch data at their outputs (e.g., effectively blocking data at the input of the latch circuit from being passed to the output of that latch circuit) whenever clock signal CLK is high.

Combinational logic circuitry 30 may be interposed between respective pairs of latch circuits 24. In the example of FIG. 2, a first combinational logic circuit 30-1 is interposed between the output of latch 24-1 and the input of latch 24-2, a second combinational logic circuit 30-2 is interposed between the output of latch 24-2 and the input of latch 24-3, and a third combinational logic circuit 30-3 is interposed between the output of latch 24-3 and the input of latch 24-4. Each combinational logic circuit 30 may include any desired logic elements arranged in any desired manner for performing any desired combinatorial logic operations on data received from the output a corresponding latch 24 (e.g., each logic circuit 30 may include any desired number and arrangement of logic gates such as XOR gates, OR gates, AND gates, NAND gates, etc.). If desired, external signals (not shown in the example of FIG. 2 for the sake of clarity) may be input to one or more combinational logic circuits 30 for performing desired combinatorial operations on the data. For example, external signals may be provided to one or more inputs of logic gates within logic circuits 30.

Latch circuit 24-1 may receive an input data signal over input path 28. While clock signal CLK is high (e.g., asserted at a logic level "1"), latch circuit 24-1 may latch a bit $S_0''$ corresponding to the data at its input onto its output. Bit $S_0''$ may be passed to combinational logic 30-1 which may perform logical operations on bit $S_0''$ to generate data bit $S_1'$. Bit $S_1'$ may remain at the input of second latch circuit 24-2 until clock signal CLK is low (e.g., because negative level sensitive latch circuit 24-2 only latches data at its output when clock signal CLK is low). When clock signal CLK is low, bit $S_1'$ may be latched at the output of latch circuit 24-2 (e.g., as shown by arrow 32), whereas latch 24-1 may block data from being provided to combinational logic 30-1 when clock signal CLK is low.

Bit $S_1'$ may be passed to combinational logic 30-2 and logic 30-2 may perform logical operations on bit $S_1'$ to generate bit $S_1''$. Bit $S_1''$ may remain at the input of third latch circuit 24-3 until clock signal CLK is high (e.g., because positive level sensitive latch circuit 24-3 only latches data at its output when clock signal CLK is high). When clock signal CLK is high, bit $S_1''$ may be latched at the output of latch circuit 24-3 (e.g., as shown by arrow 34).

Figure 3:
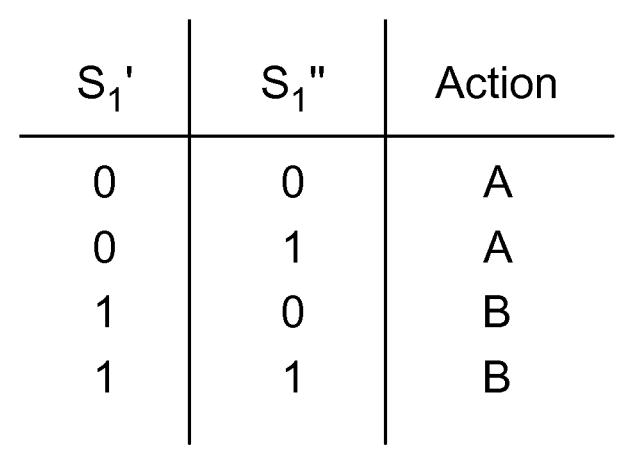

Bits $S_0'$ (e.g., the bit generated by a register prior to being passed to register 24-1), $S_0''$, $S_1'$, and $S_1''$ may be read out as an output signal via paths 36. Bits $S_0'$ at input path 16, $S_0''$, $S_1'$, and $S_1''$ may represent a state of system 22. Bits $S_1'$, and $S_1"$ may be combined to represent two different logic states equivalent to those represented by a single bit $S_1$ in the arrangement of FIG. 1. FIG. 3 shows an illustrative table of how bits $S_1'$ and $S_1"$ may be combined to represent two different logic states.

As shown in FIG. 3, a given action may be performed for two different combinations of bits $S_1'$ and $S_1"$. In the example of FIG. 3, a first action A may be performed when bits $S_1'$ and $S_1"$ are both equal to "0" or when bit $S_1'$ is equal to 0 and bit $S_1"$ is equal to "1," whereas a second action B may be performed when bits $S_1'$ and $S_1"$ are both equal to "1" or when bit $S_1'$ is equal to "1" and bit $S_1"$ is equal to "0." First action A may, for example, correspond to an action (system state) associated with bit $S_1$ of FIG. 1 being equal to "0" whereas second action B may correspond to an action (system state) associated with bit $S_1$ of FIG. 1 being equal to "1." In this way, corresponding system states may be redundantly distributed among two different bits $S_1'$ and $S_1"$ stored on sequential logic circuitry 22.

In this scenario, the combinational logic 18-1 of FIG. 1 may be divided (distributed) on both sides of latch circuit 24-2 to collectively perform the same logical operations as logic 18-1 formed on a single side of flip flop 12-2 in FIG. 1. The components of combinational logic 18-1 may be divided between combinational logic 30-1 and 30-2 such that, if logic 18-1 has a logical depth of N, logic 30-1 and 30-2 each have a logical depth of approximately N/2. In this way, circuitry 22 may encode two different system states (e.g., state "A" and state "B") using two bits $S_1'$ and $S_1"$, whereas the same states may be stored using a single bit $S_1$ in an arrangement as shown in FIG. 1. By distributing the encoding of the two system states between two bits $S_1'$ and $S_1"$, logic circuitry 22 may have reduced logic depth for combinational circuits 30-1 and 30-2 relative to the combinational logic 18-1 of FIG. 1. Circuitry 22 may thereby require less dynamic power and may incur less dynamic power glitching than circuitry 10 of FIG. 1. By shifting data through circuitry 22 using alternating positive and negative level sensitive latches, circuitry 22 may ensure that the same states as recorded using bit $S_1$ of FIG. 1 are recorded using bits $S_1'$ and $S_1"$ of FIG. 2 (while further reducing dynamic power glitching and consumption in the sequential logic circuitry).

Figure 4:
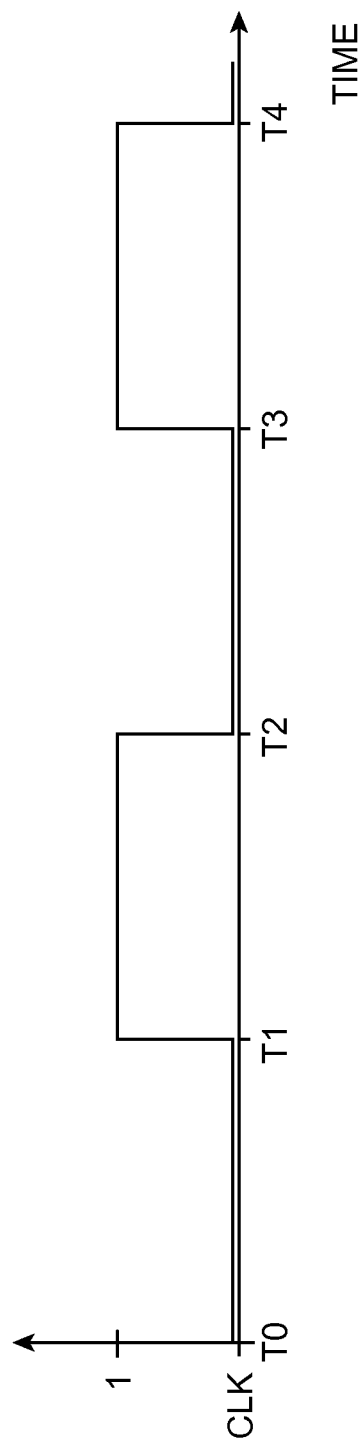
FIG. 4 is an illustrative timing diagram showing how a clock signal may be provided to sequential logic circuitry of the type shown in FIG. 2 to allow the sequential logic circuitry to store data bits while reducing the logic depth of the corresponding combinational logic in order to optimize dynamic power consumption in accordance with an embodiment of the present invention.

FIG. 4 is an illustrative timing diagram showing how clock signal CLK may be provided to sequential logic circuitry 22 of FIG. 2 for passing data through combinational logic circuitry 30 for recording desired system states. Between times T0 and T1, clock signal CLK may be deasserted to a logic low state. Between times T0 and T1, positive level sensitive latch 24-1 may block data input 28 from passing to combinational logic circuitry 30-1. At time T1, clock signal CLK may be asserted to a logic high state. Between times T1 and T2, data may be passed from the input of positive level sensitive latch 24-1 to the output of latch 24-1. In the example of FIG. 2, a given data bit $S_0"$ may be latched onto the output of latch 24-1. Data bit $S_0"$ may be operated on by logic 30-1 to generate bit $S_1'$. As clock signal CLK is high between times T1 and T2, negative level sensitive latch 24-2 may block bit $S_1'$ from passing to its output, effectively holding bit $S_1'$ until time T2.

Between times T2 and T3, bit $S_1'$ may be latched at the output of latch 24-2. Bit $S_1'$ may be read out on line 36. Combinational logic 30-2 may perform logic operations on bit $S_1'$ to generate bit $S_1"$. As clock signal CLK is low between times T2 and T3, positive level sensitive latch 24-1 may block additional bits from passing to logic circuitry 30-1, thereby preventing additional data from flooding through sequential logic circuitry 22. Similarly, between times T2 and T3, positive level sensitive latch 24-3 may block bit $S_1"$ from passing to its output. Between times T3 and T4, latch 24-3 may pass bit $S_1"$ to its output and bit $S_1"$ may be read out on line 36. Bits $S_1'$ and $S_1"$ may be combined to determine the state of system 22 (e.g., using the table of FIG. 3 and corresponding bits $S_1'$ and $S_1"$). By forming alternating positive and negative level sensitive latches in circuitry 22, latches 24 may serve as flood gates that prevent flooding of data through circuitry 22, thereby allowing the bits to be read out for determining the recorded state of the system.

In this way, the same combinational operations that were performed by logic circuitry 18 of logic depth N in the arrangement of FIG. 1 may be performed by two separate logic circuits 30 of logic depth N/2 using the arrangement of FIG. 2 (e.g., logic operations that generate a result over two bits that represent the same two states as encoded by a single bit in the arrangement of FIG. 1). By reducing the combinatorial logic depth by a factor of two, dynamic power consumption and glitching may be greatly reduced relative to the conventional arrangement of FIG. 1.

The example of FIGS. 2-4 is merely illustrative. In general, logic circuitry 22 may have any desired number of rounds of latching circuitry 24 interposed between any desired number of rounds of combinational logic circuitry 30 for recording system states for circuitry 22.

Figure 5:
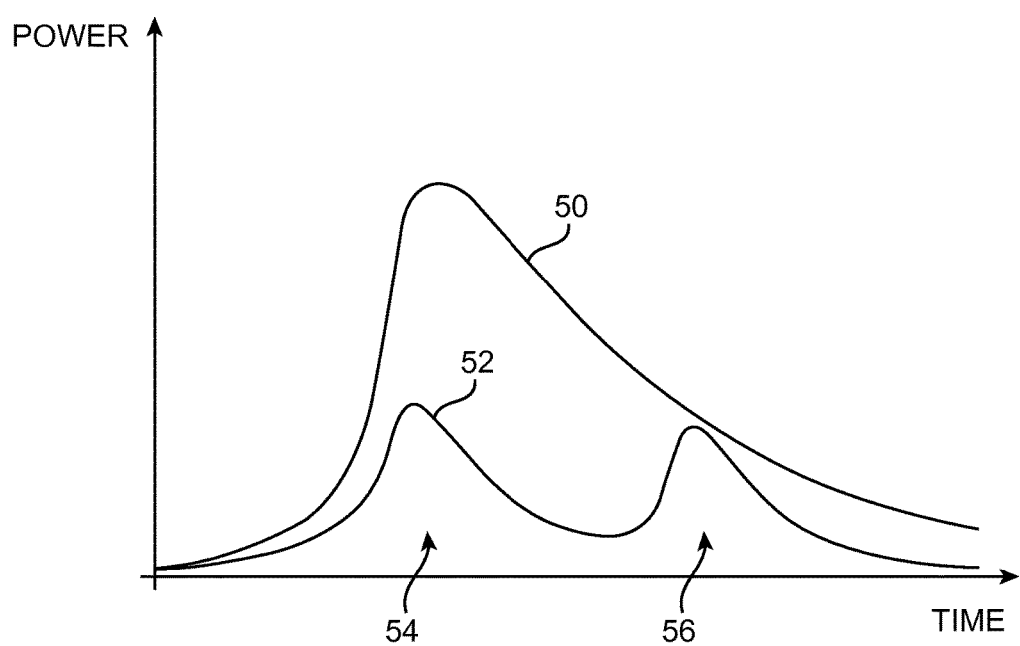
FIG. 5 is an illustrative diagram showing how dynamic power consumption may be optimized using sequential logic circuitry of the type shown in FIG. 2 relative to the conventional circuitry of FIG. 1 by distributing combinational logic for recording two different states between four different latch circuits in accordance with an embodiment of the present invention.

FIG. 5 is an illustrative plot showing how dynamic power may be reduced by distributing the combinational logic as shown in FIG. 2. FIG. 5 plots dynamic power used by sequential logic circuitry as a function of time. Curve 50 represents the power consumed by combinational logic circuit 18-1 of FIG. 1. The area under curve 50 represents the energy required by logic 18-1. Curve 52 represents the power consumed by combinational logic circuits 30-1 and 30-2 of FIG. 2 to produce representations of the same states produced by logic circuit 18-1. The area under curve 52 represents the energy required by logic 30-1 and 30-2. Portion 54 may represent the power used by logic 30-1 whereas portion 56 may represent the power used by logic 30-2. As shown in FIG. 5, the area under curve 50 is significantly greater than the area under curve 52, because logic circuitry having logic depth N (e.g., circuit 18-1) requires significantly more power and energy than two separate circuits (e.g., circuits 30-1 and 30-2) having logic depth N/2. By using the arrangement of FIG. 2 (e.g., associated with curve 52) to record logical states, dynamic power consumption and glitching may be greatly reduced relative to scenarios where an arrangement of the type shown in FIG. 1 (e.g., associated with curve 50) to record logical states is used.

Figure 6:
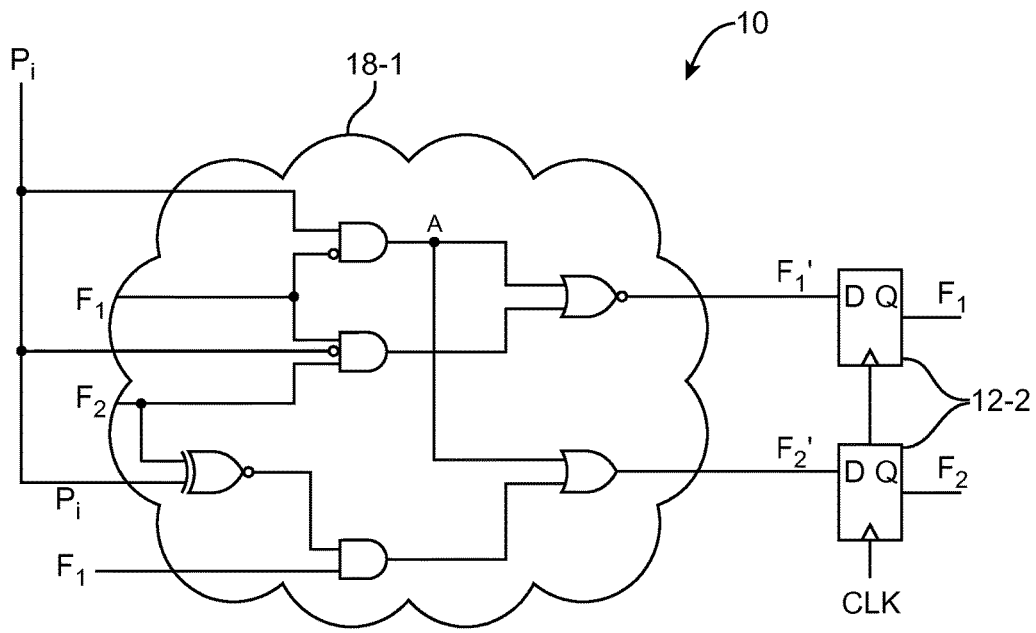
FIG. 6 is a circuit diagram of conventional sequential logic circuitry having a single set of flip flop circuits and corresponding combinational logic circuitry having a relatively high logical depth for storing four system states.

An example of conventional sequential logic circuitry having combinational logic circuitry with logic depth N is shown in FIG. 6. In the example of FIG. 6, two bits received from combinational logic 18-1 are latched by two respective flip flops 12-2 in parallel. The current system state of circuitry 10 may be represented by bits $F_1$ and $F_2$ (and input $P_i$), whereas the next state may be represented by corresponding bits $F_1'$ and $F_2'$ (and input $P_i$). Combinational logic circuitry 18-1 may have logical depth N. System inputs $P_i$ may be provided by external circuitry (e.g., inputs $P_i$ may be any arbitrary primary input). The circuitry in FIG. 6 may be a more simplified version of the circuitry shown in FIG. 1 in which a single round of flip-flop circuits stores four different states based on the values of $F_1'$, $F_2'$, and $P_i$. Logical depth N of each combinational logic circuit may be reduced to mitigate dynamic power glitching as shown in FIG. 7.

Figure 7:
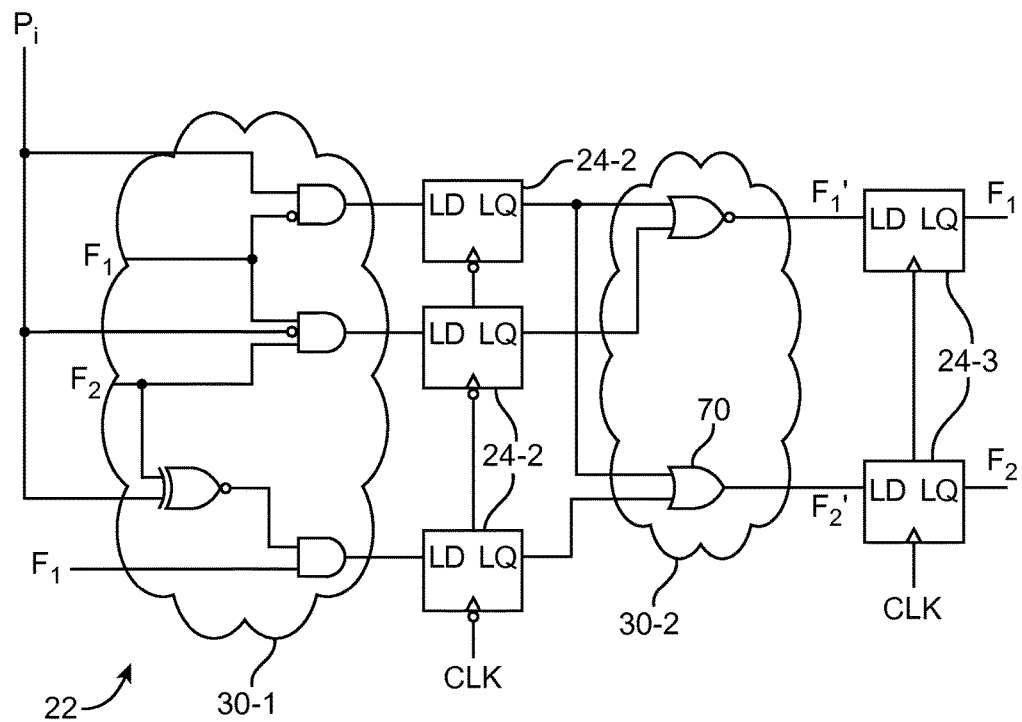
FIG. 7 is an illustrative circuit diagram of sequential logic circuitry having two sets of latch circuits and corresponding first and second combinational logic circuits each having a relatively low logical depth for storing four system states in accordance with an embodiment of the present invention.

FIG. 7 is an illustrative circuit diagram showing an example of how the combinational logic circuitry may be distributed across a given round of latch circuitry. As shown in FIG. 7, the combinational logic circuit may be distributed on two sides of a corresponding round of latch circuitry 24-2 (similar to latch circuitry 24-2 of FIG. 2). In the example of FIG. 7, combinational logic circuitry 30 generates the same bits $F_1'$ and $F_2'$ as logic 18-1 of FIG. 6 but with approximately half of the logical depth per combinational circuit (e.g., logic 18-1 may be split into logic 30-1 and logic 30-2 on opposing sides of negative level sensitive latch circuitry 24-2), thereby allowing a power consumption corresponding to curve 52 of FIG. 5 (whereas the circuitry of FIG. 6 consumes power corresponding to curve 50 of FIG. 5). In this example, a third latch circuit 24-2 is used in the round of negative level sensitive latching circuitry to ensure that logic circuit 30-2 produces the same bits $F_1'$ and $F_2'$ as would be produced by logic 18-1, while still allowing for reduction in dynamic power glitching and consumption. Circuitry 22 may be clocked using clock signal CLK as shown in FIG. 4, for example.

Positive level sensitive latch circuitry 24-3 (similar to latch circuitry 24-2 of FIG. 2) may receive bits $F_1'$ and $F_2'$. By forming negative level sensitive latch circuitry 24-2 and positive level sensitive latch circuitry 24-3 on opposing sides of second combinational logic 30-2 (similar to as shown in FIG. 2), latches 24 may serve as a floodgate to prevent data from flooding through the sequential logic circuitry. The circuitry of FIG. 7 may, for example, be a more simplified version of the circuitry shown in FIG. 2 in which two rounds of latch circuits are used to store four different states based on the values of $F_1'$, $F_2'$, and $P_i$ (e.g., the same four states recorded by the circuitry of FIG. 6 having undesirably large logical depth N). By reducing the logical depth of combinational logic circuitry 30 relative to logic circuitry 18 of FIG. 6 while still being able to generate the same system states, the circuitry of FIG. 7 may reduce dynamic power glitching relative to logic circuitry having logical depth N without sacrificing the ability to record a desired number of system states.

The example of FIG. 7 is merely illustrative. If desired, logic circuitry 30 may include any desired number and arrangement of logic elements and any desired number of bits may be used to encode the state. For example, circuits 30-1 and 30-2 may include any desired number and arrangement of logic OR gates, XOR gates, AND, gates, etc. Primary inputs $P_i$ may be connected to logic 30 in any desired manner or may, if desired, by omitted. In the example of FIGS. 6 and 7, outputs $F_1$ and $F_2$ of flip flops 12-2 and latches 24-3 are fed back as an input to logic circuitry 18-1/30-1 (e.g., in this scenario, latches such as latches 24-1 and 24-4 as shown in FIG. 2 may be omitted), so that a new state of circuitry 22 serves as an input for computing the subsequent state of circuitry 22 (e.g., so that outputs $F_1$ and $F_2$ are input to combinational logic circuitry 30-1 for computing a subsequent system state). This example is merely illustrative. If desired, circuitry 22 may receive any desired inputs.

Figures 8, 9:
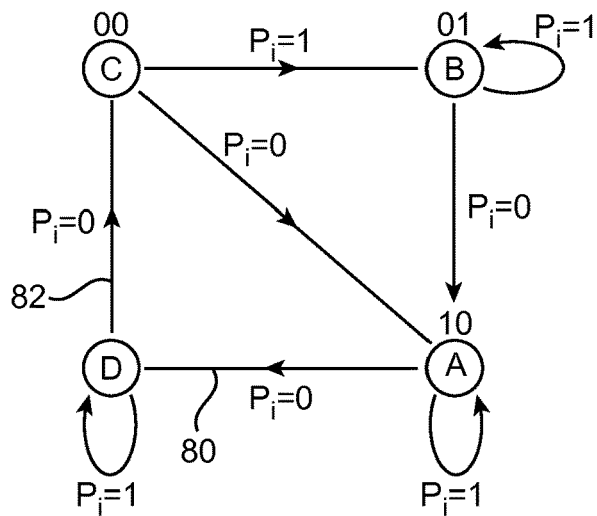
FIG. 8 is an illustrative state diagram of the system states that may be stored using sequential logic circuitry of the type shown in FIG. 7 in accordance with an embodiment of the present invention.
FIG. 9 is an illustrative table corresponding to the state diagram of FIG. 8 for generating and storing system states in sequential logic circuitry of the type shown in FIG. 7 in accordance with an embodiment of the present invention.

FIG. 8 is an illustrative state diagram showing how circuitry 20 of FIG. 7 may change states. FIG. 9 shows an illustrative state transition table corresponding to the state diagram of FIG. 6. As shown in FIG. 9, Boolean logical functions may define the combinatorial logical functions performed by logic 30-1 and 30-2 (or by logic 18-1 as shown in FIG. 6) on bits $F_1$ and $F_2$ and input $P_1$ to produce bits $F_1'$ and $F_2'$. This example is merely illustrative. In general, any desired logic functions may be used.

As shown in FIGS. 8 and 9, when primary input $P_1$ is provided at logic "0," the current state of bit $F_1$ is logic "0," and the current state of bit $F_2$ is logic "0" or logic "1," logic 30-1 and 30-2 may compute corresponding bits $F_1'$ and $F_2'$ equal to "1" and "0" respectively such that system 22 is in state A (e.g., as computed by the Boolean logic functions and table of FIG. 9). After feeding bits $F_1'$ and $F_2'$ back into the input of logic 30-1, bits $F_1'$ and $F_2'$ of a current round become input bits $F_1$ and $F_2$ of the next round of sequential logic computation. If primary input $P_i$ is provided at logic "1," circuitry 22 may remain in state A (e.g., as shown by the seventh line of the table of FIG. 9). If primary input $P_1$ is provided at logic "0," the state may shift to state D as shown by path 80 in which corresponding bits $F_1'$ and $F_2'$ computed by logic 30-1 and 30-2 as "1" and "1." Bits $F_1'$ and $F_2'$ may be fed back into the input of logic 30-1 such that bits $F_1'$ and $F_2'$ become input bits $F_1$ and $F_2$ of the next round. If primary input $P_1$ is provided at logic "1," circuitry 22 may remain in state D. If primary input $P_i$ is provided at logic "0," the system may shift to state C as shown by path 82. This process may repeat for subsequent rounds and based on primary input $P_i$ so that circuitry 22 has one of four states A, B, C, and D (e.g., based on the rules of the table of FIG. 9 which is, in turn, determined by the arrangement of logical elements within circuitry 30). The circuitry of FIGS. 6 and 7 may each store states A, B, C, and D using corresponding combinational logic. However, the circuitry of FIG. 7 may store the same states while reducing the logical depth and therefore the dynamic power consumption and glitching relative to the circuitry of FIG. 6 in which only a single flip flop round is used.

Figure 10:
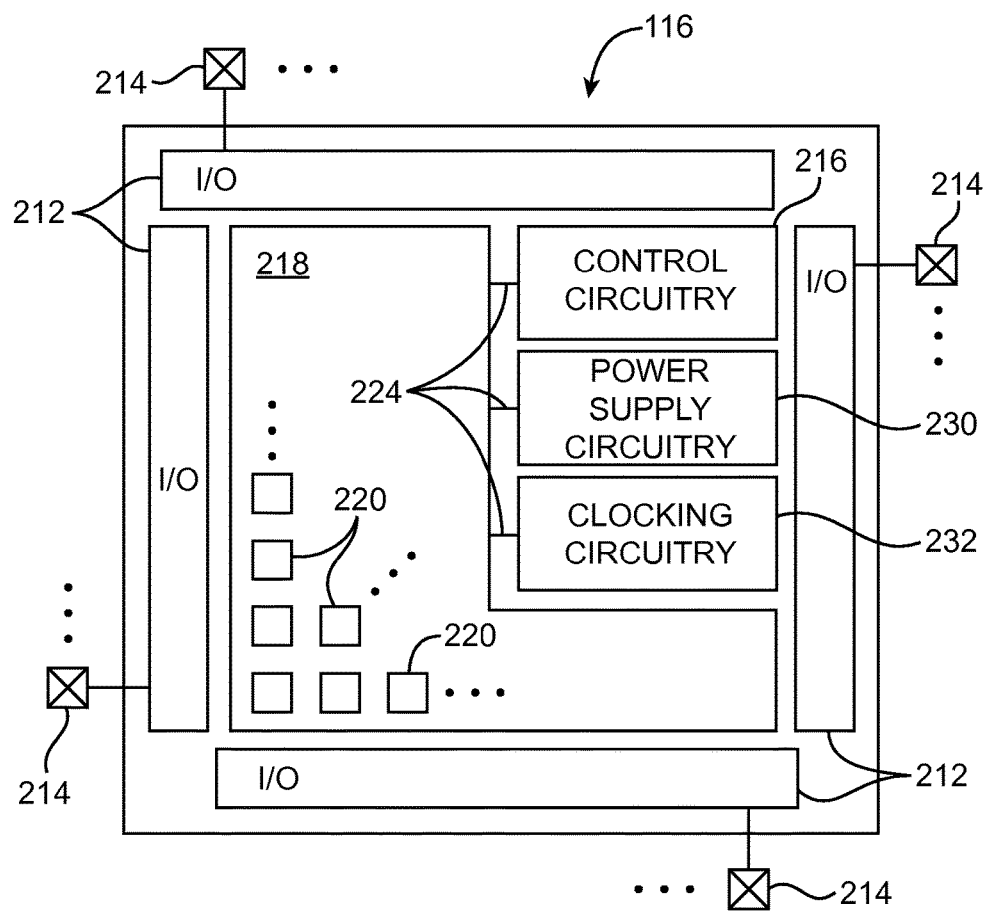
FIG. 10 is an illustrative diagram of an integrated circuit device that may include sequential logic circuitry of the type shown in FIGS. 2 and 7 for optimizing dynamic power consumption relative to conventional sequential logic circuitry in accordance with an embodiment of the present invention.

If desired, sequential logic circuitry 22 may be implemented as part of one or more integrated circuits in a system such as a computing system. Integrated circuits such as integrated circuits that include sequential logic circuitry having improved dynamic power consumption such as circuitry 22 may contain memory elements, processing circuitry, or other suitable integrated circuit elements. FIG. 10 shows an example of an integrated circuit such as integrated circuit 116 on which sequential logic circuitry 22 may be implemented. As shown in FIG. 10, integrated circuit 116 may have input-output (I/O) circuitry 212 for driving signals off of device 116 and for receiving signals from other devices via input-output pins 214. Integrated circuit 116 may be a memory chip, a digital signal processor (DSP), a microprocessor, an application specific integrated circuit (ASIC), or a programmable integrated circuit, for example.

Integrated circuit 116 may include processing circuitry formed in a region 218. Region 218 may sometimes be referred to herein as a processing core region or core region of integrated circuit 116. Integrated circuit 116 may include control circuitry such as control circuitry 216 that is coupled to core region 218 by paths 224. Paths 224 may, for example, be conductive interconnect paths such as vertical and/or horizontal conductive lines or buses connected between region 218 and control circuitry 216.

Core region 218 may include multiple processing core circuits 220 that are each controlled by control circuitry 216 to perform desired processing operations. In one suitable arrangement that is sometimes described herein as an example, integrated circuit 116 may perform processing operations to maintain a digital cryptocurrency. Digital currencies serve as a digital medium of exchange in which the digital currencies may be transferred in exchange for goods and services. Cryptocurrencies are examples of digital currencies in which cryptography governs the creation and exchange of value. An example of a crypto-currency is the Bitcoin cryptocurrency that is governed by the Bitcoin protocol. This is in contrast to traditional mediums of exchange that are governed, for example, by a central authority.

The Bitcoin protocol defines a system in which the creation and distribution of the bitcoin cryptocurrency is governed by consensus among a peer-to-peer network (e.g., a peer-to-peer network to which integrated circuit 116 belongs). The network maintains a public ledger in which new transactions are verified and recorded by members of the network via cryptography. The operations of verifying and recording transactions of cryptocurrencies such as transactions in the bitcoin cryptocurrency are sometimes referred to as mining, because completion of each mining operation typically rewards the miner with newly created cryptocurrency (e.g., bitcoins). Bitcoin mining operations involve identifying a solution to a cryptographic puzzle in which transactions that are to be verified form part of the puzzle parameters. Bitcoin mining operations are typically performed via brute-force techniques (e.g., an exhaustive search for a puzzle solution performed across all possible solutions). The difficulty of the cryptographic puzzle has led to the use of dedicated circuitry designed specifically for Bitcoin mining.

If desired, control circuitry 216 may control processor cores 220 to perform an exhaustive search for a solution to a cryptographic puzzle as governed by the Bitcoin protocol (e.g., control circuitry 216 may control processor cores 220 to perform Bitcoin mining operations). If desired, control circuitry 216 may assign respective search spaces to each core 220 for searching for a solution to the cryptographic puzzle. Circuitry 216 may provide external signals P to sequential logic circuitry 22, for example (FIG. 7). If desired, circuitry 216 may receive bits from logic circuitry 22 that record the state of circuitry 22 such as bits $S_1'$ and $S_1''$ via paths 36 (FIG. 2). Circuitry 216 may combine the bits received from circuitry 22 to identify a logical state of circuitry 22 (e.g., to determine the logical state recorded by circuitry 22 at any given time). This example is merely illustrative and, in general, processing cores 220 may perform any desired digital processing operations.

Integrated circuit 116 may include power supply circuitry such as power supply circuitry 230 and timing circuitry such as clock circuitry 232. Power supply circuitry 230 may power processing cores 220 (e.g., over paths 224). If desired, power supply circuitry 230 may supply the same amount of power to each core circuit 220 or may provide different amounts of power to different core circuits 220. Clocking circuitry 232 may generate a clocking signal having a desired clock frequency for controlling the timing of processing cores 220. Clocking circuitry 232 may generate the clocking signal using any desired clocking circuitry (e.g., a phase-locked loop (PLL) circuit, a voltage controlled oscillator (VCO) circuit, an off-chip crystal oscillator, etc.). Clocking circuitry 232 may, for example, provide clocking signal CLK to sequential logic circuitry 22 implemented on device 116.

Processing cores 220 may include digital logic circuitry and any desired circuit elements for performing desired processing operations. For example, core circuits 220 may include, but are not limited to, structures such as metal-oxide-semiconductor field-effect transistors (MOSFETs), bipolar junction transistors (BJTs), diode structures, fuses, memory elements, resistors, capacitors, inductors, intellectual property (IP) blocks, digital logic circuitry such as adders, exclusive OR (XOR) gates, AND gates, and other suitable integrated circuit processing/storage components.

Sequential logic circuitry 22 having distributed combinational logic may be formed as a portion of one or more cores 220, as other circuitry on core region 218, as a portion of control circuitry 216, power supply circuitry 230, clocking circuitry 232, and/or I/O circuitry 212 (e.g., any portion of integrated circuit 116 that records finite digital states may be formed using sequential logic circuitry 22). Sequential logic circuitry 22 may be powered using power supply circuitry 230. Sequential logic circuitry 22 implemented on chip 116 may consume less of the energy produced by power supply circuitry 230 than conventional logic circuitry such as logic circuitry 10 of FIG. 1. For example, reducing energy consumption on device 116 may allow for a greater number of processing cores 220 operating with greater efficiency to be formed on device 116 for a given amount of power generated by power supply circuitry 230 (e.g., allowing circuit 116 to find solutions to cryptographic puzzles for generating cryptocurrency such as bitcoins with greater speed and efficiency than devices formed using sequential logic of the type shown in FIG. 1).

The foregoing is merely illustrative of the principles of this invention and various modifications can be made by those skilled in the art without departing from the scope and spirit of the invention. The foregoing embodiments may be implemented individually or in any combination.

What is claimed is:

1. An integrated circuit, comprising:
   a first latch having a first latch input and a first latch output;
   a second latch having a second latch input and a second latch output;
   clocking circuitry that provides a clock signal to the first and second latches;
   combinatorial logic circuitry coupled between the first latch output and the second latch input, wherein the first latch is configured to pass a first bit from the first latch input to the first latch output when the clock signal is received at a first logic level and is configured to block the first bit from passing from the first latch input to the first latch output when the clock signal is received at a second logic level that is different from the first logic level, the combinatorial logic circuitry is configured to generate a second bit based on at least the first bit, the second latch is configured to block the second bit from passing to the second latch output when the clock signal is received at the first logic level and is configured to pass the second bit from the second latch input to the second latch output when the clock signal is received at the second logic level, and the first and second bits identify only two logical states for a finite state machine on the integrated circuit,
   wherein the finite state machine is constructed to combine the first bit and the second bit to represent two different logical states,
   wherein the integrated circuit is constructed to perform a first action for a first combination of the first bit and the second bit and for a second combination of the first bit and the second bit, and
   wherein the integrated circuit is constructed to perform a second action for a third combination of the first bit and the second bit and for a fourth combination of the first bit and the second bit;
   a plurality of processing cores; and
   control circuitry, wherein the control circuitry is configured to control the plurality of processing cores to solve a cryptographic puzzle by assigning a plurality of different search spaces to each of the plurality of processing cores, wherein the finite state machine includes the first latch, the second latch, and the combinatorial logic circuitry, wherein the finite state machine is formed in a given one of the plurality of processing cores, and wherein the given one of the plurality of processing cores is configured to solve the cryptographic puzzle using at least the two logical states of the finite state machine.

2. The integrated circuit defined in claim 1, wherein the first logic level comprises a logic low level and the second logic level comprises a logic high level.

3. The integrated circuit defined in claim 1, wherein the control circuitry is configured to control the plurality of processing cores to generate a crypto-currency by solving the cryptographic puzzle, and wherein the plurality of processing cores are configured to solve the cryptographic puzzle by performing Simple Hash Algorithm 256 (SHA-256) hashing operations.

4. The integrated circuit defined in claim 3, wherein the crypto-currency comprises a Bitcoin crypto-currency.

5. The integrated circuit defined in claim 4,
wherein the given one of the plurality of processing cores is constructed to perform a first action for a first combination of the first bit and the second bit and for a second combination of the first bit and the second bit, and
wherein the given one of the plurality of processing cores is constructed to perform a second action for a third combination of the first bit and the second bit and for a fourth combination of the first bit and the second bit.

6. The integrated circuit defined in claim 1, wherein the control circuitry is configured to provide a control bit to the combinatorial logic circuitry and the combinatorial logic circuitry is configured to generate the second bit by performing Boolean logic operations on the first bit and the control bit.

7. The integrated circuit defined in claim 6, further comprising:
a third latch; and
first additional combinatorial logic circuitry interposed between the second latch and the third latch.

8. The integrated circuit defined in claim 7, further comprising:
a fourth latch; and
second additional combinatorial logic circuitry interposed between the fourth latch and the first latch, wherein the second additional combinatorial logic circuitry is configured to generate the first bit.

9. The integrated circuit defined in claim 8, further comprising:
third additional combinatorial logic circuitry coupled to an input of the fourth latch.

10. The integrated circuit defined in claim 9, wherein the second and fourth latches comprise positive level sensitive latches and the first and third latches comprise negative level sensitive latches.

11. An integrated circuit, comprising:
a first processing core that includes a finite state machine, wherein the finite state machine comprises:
a first latch having a first latch input and a first latch output;
a second latch having a second latch input and a second latch output;
clocking circuitry that provides a clock signal to the first and second latches; and
combinatorial logic circuitry coupled between the first latch output and the second latch input, wherein the first latch is configured to pass a first bit from the first latch input to the first latch output when the clock signal is received at a first logic level, the combinatorial logic circuitry is configured to generate a second bit based on at least the first bit, the second latch is configured to block the second bit from passing to the second latch output when the clock signal is received at the first logic level, and the first and second bits identify only two logical states for a finite state machine on the integrated circuit, wherein the finite state machine is constructed to combine the first bit and the second bit to represent two different logical states;
at least a second processing core; and
control circuitry, wherein the control circuitry is configured to control at least the first processing core and the second processing core to solve a cryptographic puzzle by assigning a plurality of different search spaces to each of the plurality of processing cores,
wherein the first processing core is constructed to solve the cryptographic puzzle by:
performing a first action for a first combination of the first bit and the second bit and for a second combination of the first bit and the second bit, and
performing a second action for a third combination of the first bit and the second bit and for a fourth combination of the first bit and the second bit,
wherein the second latch is constructed to pass the second bit from the second latch input to the second latch output when the clock signal is received at a second logic level that is different from the first logic level and wherein the first latch is constructed to block the first bit from passing from the first latch input to the first latch output when the clock signal is received at the second logic level.

12. The integrated circuit defined in claim 11,
wherein the first latch is a positive level sensitive latch, and
wherein the second latch is a negative level sensitive latch.

13. The integrated circuit defined in claim 11,
wherein the first latch is a negative level sensitive latch, and
wherein the second latch is a positive level sensitive latch.

* * * * *